(12) United States Patent
Miles (10) Patent No.: US 8,516,041 B1
(45) Date of Patent: Aug. 20, 2013

(54) PRE-FETCHING ASYNCHRONOUSLY REQUESTED CONTENT

(75) Inventor: Steven A. Miles, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 261 days.

(21) Appl. No.: 13/110,376

(22) Filed: May 18, 2011

(51) Int. Cl.
*G06F 15/16* (2006.01)
*G06F 15/173* (2006.01)

(52) U.S. Cl.
USPC ........... 709/203; 709/217; 709/219; 709/224; 709/226

(58) Field of Classification Search
USPC ............... 709/203, 217, 219, 223, 224, 226, 709/227, 245
See application file for complete search history.

(56) References Cited

U.S. PATENT DOCUMENTS

| | | | | |
|---|---|---|---|---|
| 7,792,948 | B2 * | 9/2010 | Zhao et al. | 709/224 |
| 7,853,699 | B2 * | 12/2010 | Wu et al. | 709/217 |
| 8,364,750 | B2 * | 1/2013 | Bolognese et al. | 709/203 |
| 2004/0078486 | A1 * | 4/2004 | Salahshoor et al. | 709/245 |
| 2006/0095576 | A1 * | 5/2006 | Perry et al. | 709/227 |
| 2011/0238738 | A1 * | 9/2011 | Wu et al. | 709/203 |

\* cited by examiner

*Primary Examiner* — Quang N Nguyen
(74) *Attorney, Agent, or Firm* — Thomas | Horstemeyer, LLP (57) ABSTRACT

Disclosed are various embodiments for pre-fetching data from a service in advance of obtaining an asynchronous callback for the data from a client. It is determined whether a network page requested by a client is configured to prompt the client to initiate an asynchronous callback for data that may be pre-fetched. The data is pre-fetched from a service before obtaining the asynchronous callback for the data from the client. The data that has been pre-fetched from the service is sent to the client in response to obtaining the asynchronous callback for the data from the client.

25 Claims, 7 Drawing Sheets

PRE-FETCHING ASYNCHRONOUSLY REQUESTED CONTENT

BACKGROUND

Network pages, such as web pages, have grown increasingly complex to assemble. In years past, most network pages were static files containing hypertext markup language (HTML). Network page servers were configured simply to read the files from a data store and serve them up to browser applications. Now, nearly all network pages are dynamically generated by template engines and/or other network page generation software.

Ajax refers to a group of interrelated web development technologies that may be used to create interactive applications. In particular, the term "Ajax" may refer, for example, to the asynchronous use of JavaScript and extensible markup language (XML) on the client-side. Ajax may use, for example, a combination of cascading style sheets (CSS) and HTML to format content. The document object model (DOM) corresponding to the content may be accessed with JavaScript in order to provide dynamic updates to the content. The dynamic updates may occur asynchronously with respect to the loading of the original content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to pre-fetching data that is to be asynchronously requested by a client. It is often desirable for a network page to include content that is to be requested and obtained asynchronously with respect to the network page. Such content may require communication with one or more services and may take a relatively long time to process and build. If such content were loaded synchronously with the network page, rendering of the network page would be delayed, leading to user frustration. By loading such content asynchronously, an incomplete version of the network page may be rendered initially, with the asynchronous content being rendered later. The user experience is thereby improved, with the user having fast access to at least a preliminary version of the network page.

Various embodiments of the present disclosure improve the rendering speed of asynchronous content by pre-fetching the content at the network page server. Although obtaining some instances of asynchronous content may depend at least in part on user input or parameters that are available only after the network page is initially rendered in the client, other instances of asynchronous content may be obtained in response to the original network page request. In the latter cases, the asynchronous content may be pre-fetched from one or more services and cached by the network page server before the callback is received from a client. The cached content may facilitate a faster response time to the callback, thereby improving rendering performance for the asynchronous content. In the following discussion, a general description of the system and its components is provided, followed by a discussion of the operation of the same.

Figure 1:
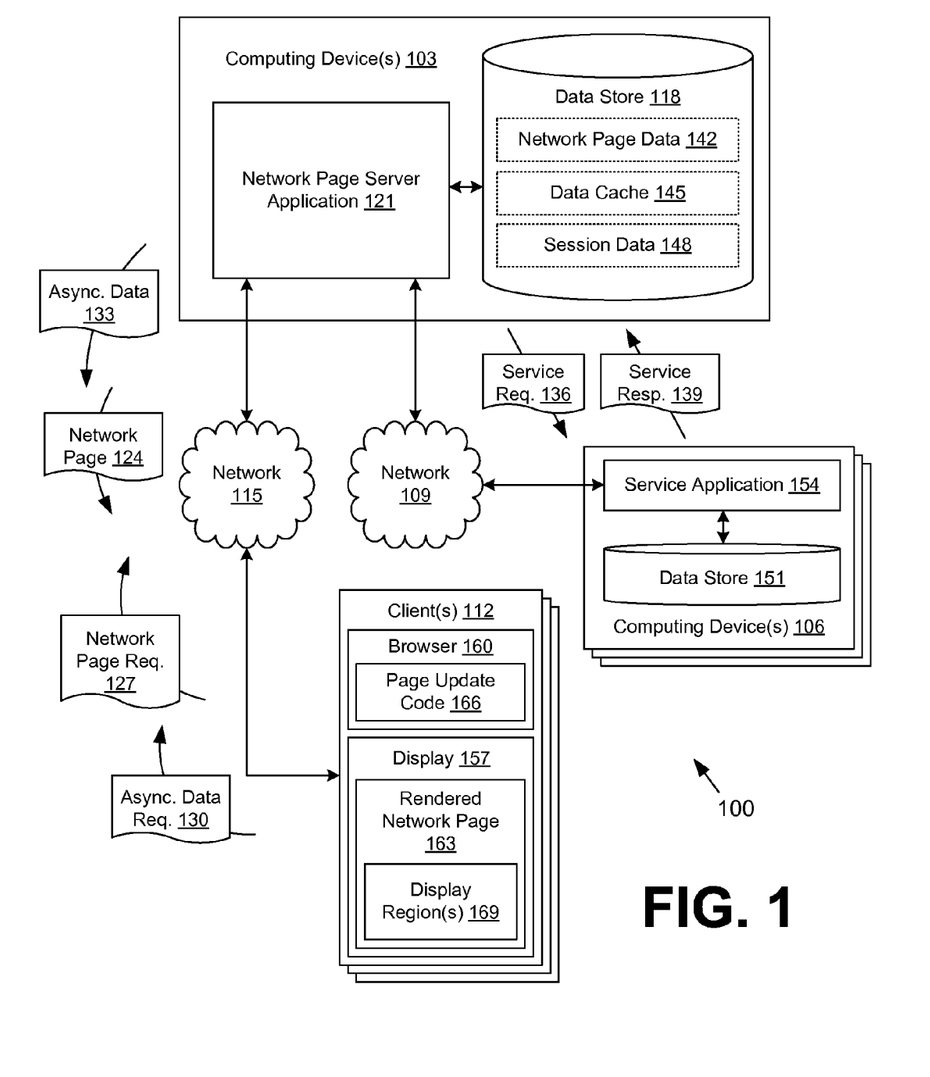
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 by way of a network 109. The computing devices 103 are also in data communication with one or more clients 112 by way of a network 115. The networks 109 and 115 may include, for example, the Internet, intranets, extranets, wide area networks (WANs), local area networks (LANs), wired networks, wireless networks, or other suitable networks, etc., or any combination of two or more such networks. The networks 109 and 115 may be the same network or different networks. In one embodiment, the network 109 corresponds to an internal network, while the network 115 corresponds to a public network.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 118 that is accessible to the computing device 103. The data store 118 may be representative of a plurality of data stores 118 as can be appreciated. The data stored in the data store 118, for example, is associated with the operation of the various applications and/or functional entities described below.

The components executed on the computing device 103, for example, include a network page server application 121 and other applications, services, processes, systems, engines, or functionality not discussed in detail herein. The network page server application 121 is executed to generate and serve up network pages 124, such as web pages or other forms of network content. The network pages 124 are sent to clients 112 in response to network page requests 127 obtained from the clients 112. Additionally, the network page server application 121 may obtain asynchronous data requests 130 from the clients 112 and respond with asynchronous data 133.

The network page server application 121 obtains the asynchronous data 133 (or data used to generate the asynchronous data) from a service executed on the computing devices 106 by sending a service request 136. The service responds to the network page server application 121 with a service response 139. The network page server application 121 is configured to pre-fetch the asynchronous data 133 before obtaining the asynchronous data request 130 where possible. In various embodiments, the network page server application 121 may include a commercially available hypertext transfer protocol (HTTP) server such as, for example, Apache® HTTP Server, Microsoft® Internet Information Services (IIS), Apache® Tomcat®, etc.

The data stored in the data store 118 includes, for example, network page data 142, a data cache 145, session data 148, and potentially other data. The network page data 142 includes any data used to generate the network pages 124 such as, for example, code, templates, text, graphics, images, audio, video, and so on. The data cache 145 is used to store pre-fetched data obtained from a service that is to be returned to a client 112 as asynchronous data 133. The data in the data cache 145 may be associated with a unique identifier. The session data 148 corresponds to session identifiers, cookies, etc. that may be used by the network page server application 121 to track users across a session and identify HTTP requests.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above. In various embodiments, the computing device 106 may be the same as the computing device 103 or different from the computing device 103.

Various applications and/or other functionality may be executed in the computing device 106 according to various embodiments. Also, various data is stored in a data store 151 that is accessible to the computing device 106. The data store 151 may be representative of a plurality of data stores 151 as can be appreciated. The data stored in the data store 151, for example, is associated with the operation of the various applications and/or functional entities described below.

The components executed on the computing device 106, for example, include a service application 154 and other applications, services, processes, systems, engines, or functionality not discussed in detail herein. The service application 154 corresponds to a web service or other service within a service-oriented architecture. The service application 154 accepts service requests 136 over the network 109 and responds to the service requests 136 with service responses 139. To this end, the service application 154 may employ simple object access protocol (SOAP), HTTP, extensible markup language (XML), and/or other technologies to facilitate communication and data exchange with service clients such as the network page server application 121.

In one embodiment, the service application 154 may use an internal cache to speed the return of data in the service response 139. However, even if the service application 154 employs a data cache, it is understood that the network page server application 121 may achieve a performance improvement for the client 112 by pre-fetching data. At the least, pre-fetching data may eliminate an extra hop in the network 109, thereby reducing latency. Although only one service application 154 is discussed, it is contemplated that there may be many different service applications 154 within a service-oriented architecture. The various service applications 154 may have different response times based, for example, on time to acquire data and generate the service response 139, volume of service requests 136, complexity of the service request 136, and/or other factors.

The client 112 is representative of a plurality of client devices that may be coupled to the network 115. The client 112 may comprise, for example, a processor-based system such as a computer system. Such a computer system may be embodied in the form of desktop computers, laptop computers, personal digital assistants, cellular telephones, smartphones, set-top boxes, music players, web pads, tablet computer systems, game consoles, electronic book readers, or other devices with like capability. The client 112 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 112 may be configured to execute various applications such as a browser 160 and/or other applications. The browser 160 may be executed in a client 112, for example, to access and render network pages 124, such as web pages, or other network content served up by the computing device 103 and/or other servers, thereby generating a rendered network page 163 on the display 157. The network pages 124 may include page update code 166 that is configured to generate asynchronous data requests 130 and to obtain asynchronous data 133. The page update code 166 may correspond to Java®, JavaScript®, VBScript, and/or other forms of client-side code that may be embedded in a network page 124. The asynchronous data 133 may be used by the page update code 166 executed in the browser 160 to update one or more display regions 169 in the rendered network page 163. The client 112 may be configured to execute applications beyond browser 160 such as, for example, email applications, instant message applications, and/or other applications.

Next, a general description of the operation of the various components of the networked environment 100 is provided. To begin, network page data 142 is configured to be used for generating network pages 124 for a network site. A developer of the network site may choose to include asynchronously requested content in the network page 124. To this end, the network page 124 may include page update code 166 that is configured to generate one or more asynchronous callbacks to the network page server application 121 or another server application for additional data to be used in updating the rendered network page 163.

When the network page server application 121 is generating the network page 124, it may be determined whether the data that will be requested by an asynchronous callback may be pre-fetched. Such data may be pre-fetched when it does not depend on user interaction in the client 112, data in the client 112, or other asynchronously obtained data that cannot be predicted. Whether data may be pre-fetched may be specified through an application programming interface (API) or configuration setting. In some embodiments, it may be automatically determined whether data may be pre-fetched. As a non-limiting example, the network page server application 121 may determine whether the service request 136 uses parameters that are not available before the asynchronous callback is made.

If the asynchronous content can be pre-fetched, the network page server application 121 is configured to request it from the appropriate service application 154 before obtaining the asynchronous callback from the client 112. The pre-fetching may be performed in another process or thread of the network page server application 121 to avoid blocking the sending of the network page 124 to the client 112. When the asynchronous content is obtained from the service application 154, it may be processed and/or transformed and then stored in the data cache 145. The content may be stored in association with a unique identifier for the client 112, the session, and/or the asynchronous callback within the session. The unique identifier may be provided in the page update code 166 so that the asynchronous callback specifies the unique identifier. Alternatively, the unique identifier may be determined from the session data 148 and a cookie provided by the browser 160.

When the network page server application 121 obtains the asynchronous callback from the client 112, the data that has been pre-fetched may or may not have been obtained from the service application 154. If the data has been obtained and stored in the cache, the cached data may be returned to the client 112. If the data has not yet been obtained but has been requested, the network page server application 121 may block until the data is obtained. If the data has not been requested (i.e., the data could not be pre-fetched), the data may be requested and the network page server application 121 may block until the data is obtained. The data is returned to the client 112, and the page update code 166 uses the data to update a rendering of the network page 124 in the client 112.

Any number of asynchronous callbacks and/or services may be involved in the rendering of a network page 124. In some cases, asynchronous callbacks for data that cannot be pre-fetched may follow asynchronous callbacks for data that can be pre-fetched, and vice versa. Further, asynchronous callbacks may be generated in response to data that is obtained asynchronously.

It is understood that the principles of the present disclosure may be extended to asynchronous data requests that depend on data available at the client 112 after the network page 124 has been sent. To this end, a first set of asynchronous data 133 that could not be pre-fetched may be obtained and sent to the client 112 in response to a first asynchronous callback. In response to the first asynchronous callback, a second set of asynchronous data 133 may be pre-fetched in anticipation of a second asynchronous callback. The second set of asynchronous data 133 may be pre-fetched based, for example, at least in part upon the first set of asynchronous data 133, the first asynchronous callback, and/or other data. The second asynchronous callback may be generated in the client 112 based, for example, at least in part on the first set of asynchronous data 133, user interaction, and/or other data.

As a non-limiting example, a network page 124 may include a dynamic display region 169 that uses pagination. Although the asynchronous data 133 related to the display region 169 may not be capable of being pre-fetched, once a user has selected the first page, the network page server application 121 may anticipate that subsequent pages will be requested. Thus, the network page server application 121 may pre-fetch data related to the second page, third page, etc. after the first page is requested. Accordingly, the data related to the second page, third page, etc. may be cached and ready to send as soon as it is requested by the client 112.

Additionally, data that is stored in the data cache 145 may be made available in connection with multiple network pages 124 and/or multiple user sessions. As a non-limiting example, asynchronous data 133 may relate to a localization of a network page 124 that is generic with respect to the user. Thus, the localization may be employed for multiple users. To this end, the data cache 145 may employ a cache control approach with timestamps to ensure, for example, that old data is purged and the latest data is presented.

Figure 2A:
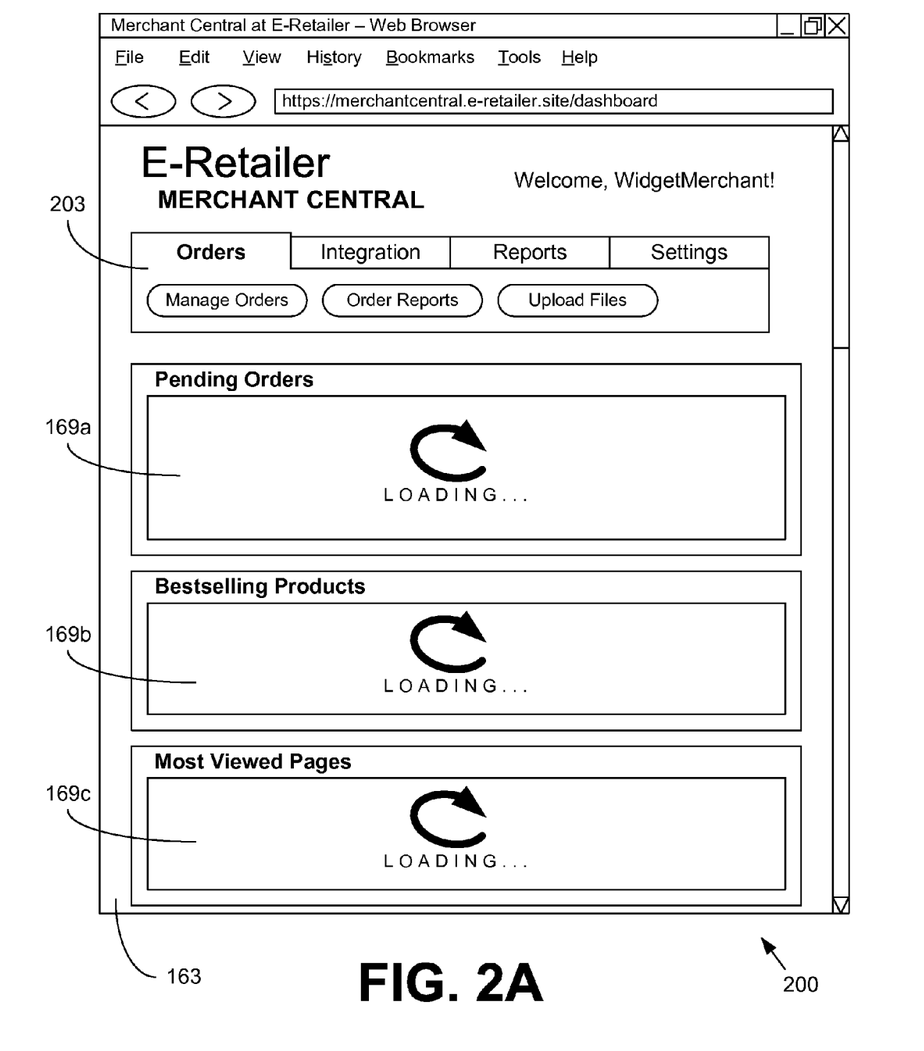
FIGS. 2A and 2B are drawings of examples of a user interface rendered by a client in the networked environment of FIG. 1 according to various embodiments of the present disclosure.

Referring next to FIG. 2A, shown is one example of a user interface 200 rendered by a browser 160 (FIG. 1) executed in a client 112 (FIG. 1) in the networked environment 100 (FIG. 1) according to various embodiments. In particular, the user interface 200 includes a rendered network page 163 that corresponds to a preliminary rendering of a network page 124 (FIG. 1). In this non-limiting example, the rendered network page 163 relates to a management dashboard for a merchant in an electronic marketplace. A navigational tool 203 and other content is initially rendered, thereby providing a preliminary version of the rendered network page 163 for the user to see and interact with while other data is loading. The navigational tool 203 allows the user to select from various management tasks, which the user may select before other content has finished loading.

The rendered network page 163 includes three display regions 169a, 169b, and 169c that feature asynchronously loaded content. The display region 169a will display a list of pending orders for the merchant, the display region 169b will display a list of bestselling products for the merchant, and the display region 169c will display a list of most viewed pages for the merchant. The data underlying these features may take some time to obtain and prepare, so these features are loaded asynchronously with respect to the network page 124. A placeholder, such as a textual description, graphic, or animation, is rendered in the display regions 169a-169c while the asynchronous data 133 (FIG. 1) underlying the features are being loaded. In this example, a "loading" graphic is rendered.

Figure 2B:
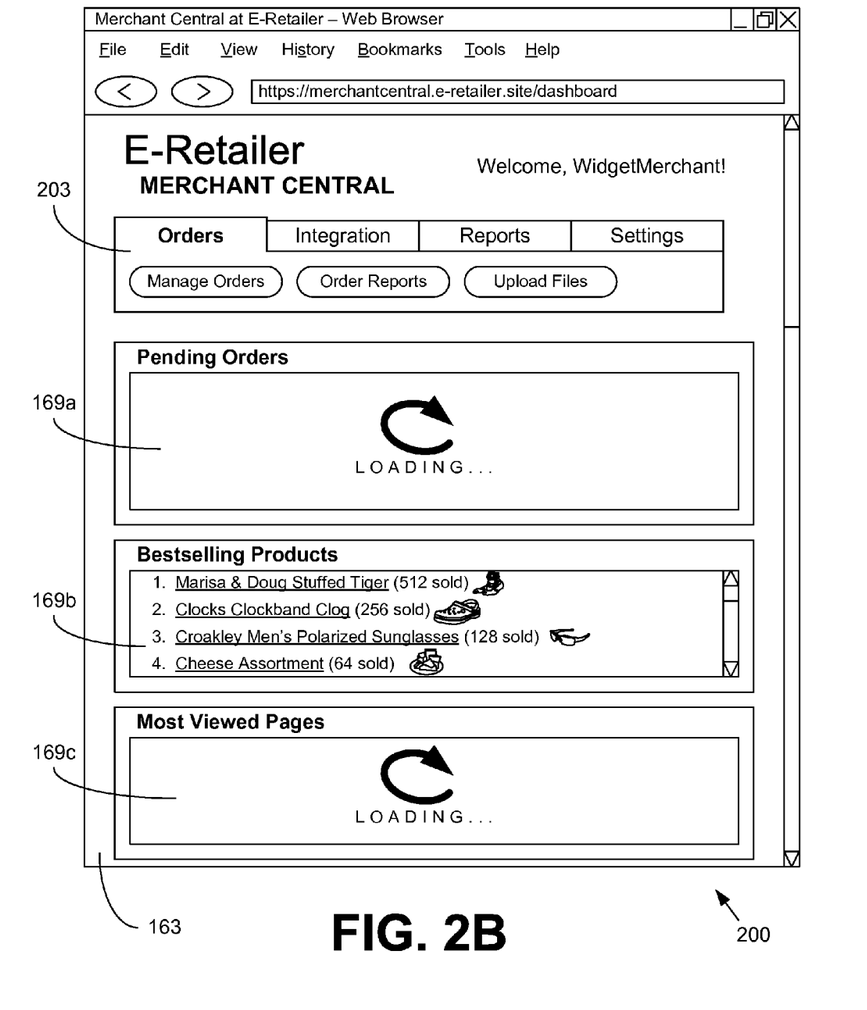

Turning now to FIG. 2B, shown is another example of a user interface 200 rendered by a browser 160 (FIG. 1) executed in a client 112 (FIG. 1) in the networked environment 100 (FIG. 1) according to various embodiments. In particular, the user interface 200 includes a rendered network page 163 that corresponds to a rendering of a network page 124 (FIG. 1) that has been updated with respect to FIG. 2A. Since the time that FIG. 2A was rendered, asynchronous data 133 (FIG. 1) has been obtained to render the feature in the display region 169b. The asynchronous data 133 to render display regions 169a and 169c have not yet been obtained by the browser 160.

The display region 169b, which may correspond to an "iframe" or other element, provides a list of bestselling products for the merchant. As shown in this non-limiting example, the list displays a title of the product that is linked to a detail page, a number of orders for the product, and a thumbnail icon for the product. Although the information used to generate the list is specific to the merchant, the rendering of the list in FIG. 2B may be performed by data that does not depend on user interaction after the network page 124 is rendered. In other words, the network page server application 121 (FIG. 1) may pre-fetch the data underlying the display region 169b before a corresponding asynchronous data request 130 (FIG. 1) is obtained from the browser 160. The asynchronous data 133 that has been pre-fetched may be cached in the data cache 145 (FIG. 1) in anticipation of the asynchronous data request 130. Alternatively, the asynchronous data 133 may arrive relatively sooner at the network page server application 121 to fulfill the asynchronous data request 130 because it has been requested before receipt of the asynchronous data request 130.

Figure 3:
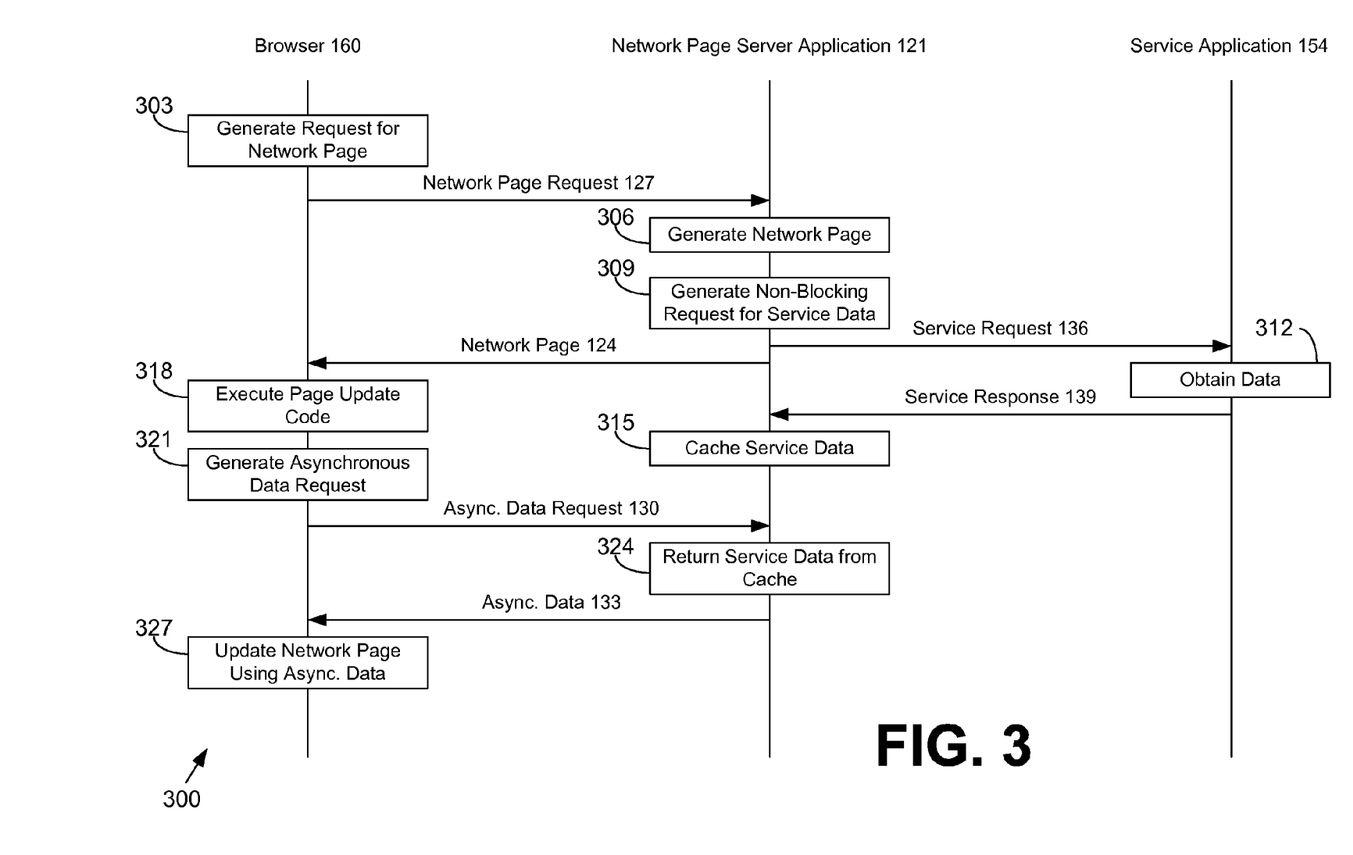
FIG. 3 depicts a sequence diagram that illustrates one example of the interaction among a browser, a network page server application, and a service application executed in computing devices within the networked environment of FIG. 1 according to various embodiments of the present disclosure.

Moving on to FIG. 3, shown is a sequence diagram 300 that illustrates one example of the interaction among a browser 160, a network page server application 121, and a service application 154 executed in the client 112 (FIG. 1), the computing device 103 (FIG. 1), and the computing device 106 (FIG. 1), respectively, within the networked environment 100 (FIG. 1) according to various embodiments. Although the tasks in the sequence diagram 300 are depicted as being in a specific order, it is understood that various tasks may be scrambled and may be performed asynchronously or in parallel with one another, leading to different possible orders. The operation of the browser 160, the network page server application 121, and the service application 154 will be discussed in further detail with respect to the flowcharts of FIGS. 4-6.

Beginning with box 303, the browser 160 generates a network page request 127. For example, a user may type in a uniform resource locator (URL) into an address bar of the browser 160, select a bookmark for the URL, select a link for the URL, or otherwise select a URL that is associated with the network page request 127. The network page request 127 is sent over the network 115 (FIG. 1) to the network page server application 121. In box 306, the network page server application 121 generates the network page 124 from the network page data 142 (FIG. 1). In box 309, the network page server application 121 generates a non-blocking request for service data in response to determining that there is an asynchronous callback in the network page 124 for data that may be pre-fetched. The service request 136 may be sent to the service application 154 any time before the asynchronous data request 130 is obtained from the client 112.

The network page 124 is returned to the browser 160. Potentially in parallel, in box 312, the service application 154 obtains data in response to the service request 136. The service application 154 returns the service response 139 to the network page server application 121. In box 315, the network page server application 121 may cache the service data, or a derivative thereof, in the data cache 145 (FIG. 1) in association with a unique identifier.

In box 318, the browser 160 executes the page update code 166 (FIG. 1) embedded in, or referenced by, the network page 124. In box 321, in response to the page update code 166 (FIG. 1), the browser 160 generates an asynchronous data request 130 which is sent to the network page server application 121 over the network 115 (FIG. 1). The asynchronous data request 130 may include the unique identifier. In box 324, the network page server application 121 returns the stored service data from the data cache 145 based at least in part on the unique identifier associated with the asynchronous data request 324. If the pre-fetched service data has not yet arrived, the network page server application 121 may block until the service data arrives.

The asynchronous data 133 is returned to the browser 160 over the network 115. In box 327, the page update code 166 executed in the browser 160 updates the rendered network page 163 (FIG. 1) based at least in part on the asynchronous data 133. Thereafter, the sequence diagram 300 ends.

Figure 4:
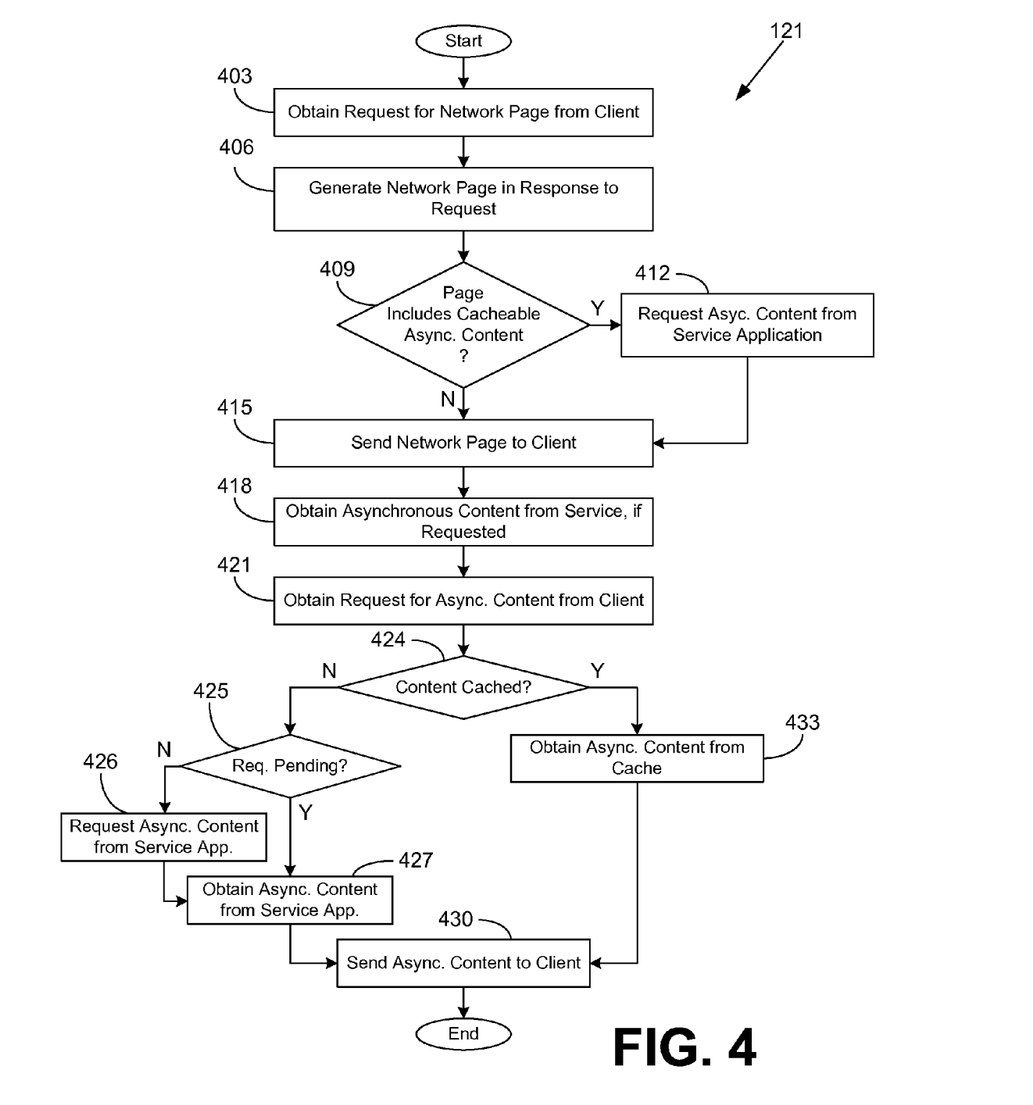
FIG. 4 is a flowchart illustrating one example of functionality implemented as portions of a network page server application executed in a computing device in the networked environment of FIG. 1 according to various embodiments of the present disclosure.

Referring next to FIG. 4, shown is a flowchart that provides one example of the operation of a portion of the network page server application 121 according to various embodiments. It is understood that the flowchart of FIG. 4 provides merely an example of the many different types of functional arrangements that may be employed to implement the operation of the portion of the network page server application 121 as described herein. As an alternative, the flowchart of FIG. 4 may be viewed as depicting an example of steps of a method implemented in the computing device 103 (FIG. 1) according to one or more embodiments.

Beginning with box 403, the network page server application 121 obtains a network page request 127 (FIG. 1) from a client 112 (FIG. 1). In box 406, the network page server application 121 generates a network page 124 (FIG. 1) in response to the network page request 127. In box 409, the network page server application 121 determines whether the network page 124 includes asynchronous content that may be pre-fetched or cached. If the network page server application 121 determines that the network page 124 includes asynchronous content that may be pre-fetched, the network page server application 121 moves to box 412 and requests the asynchronous content from the respective service application 154 (FIG. 1) over the network 109 (FIG. 1) via a service request 136 (FIG. 1). Thereafter, the network page server application 121 proceeds to box 415. If the network page 124 does not include asynchronous content that may be pre-fetched, the network page server application 121 also proceeds to box 415.

In box 415, the network page server application 121 sends the network page 124 to the client 112 over the network 115 (FIG. 1). In box 418, the network page server application 121 obtains the asynchronous content that has been requested from the service application 154 in a service response 139 (FIG. 1) if such content has been requested. The asynchronous content may be stored in a data cache 145. In some situations, the flow of the network page server application 121 may continue to box 421 without obtaining the asynchronous content. In box 421, the network page server application 121 obtains an asynchronous data request 130 (FIG. 1) from the client 112.

In box 424, the network page server application 121 determines whether the requested data has been cached. If the content has not been cached, the network page server application 121 moves to box 425. In box 425, the network page server application 121 determines whether a service request 136 is pending with the service application 154. For example, a service request 136 to pre-fetch the asynchronous data may have been sent in box 418, but the data might not have been obtained in box 418. Such a service request 136 may still be pending, or the service request 136 may have timed out and may no longer be pending. If no service request 136 is pending, the network page server application 121 moves to box 426 and requests the asynchronous content from the service application 154 in a service request 136. Thereafter, the network page server application 121 proceeds to box 427. If a service request 136 is pending, the network page server application 121 also proceeds to box 427.

In box 427, the network page server application 121 requests and obtains the asynchronous content from the service application 154. Thereafter, the network page server application 121 proceeds to box 430. If the network page server application instead determines in box 424 that the requested data has been cached, then in box 433, the network page server application 121 obtains the asynchronous content from the data cache 145 (FIG. 1). Thereafter, the network page server application 121 also proceeds to box 430.

In box 430, the network page server application 121 sends the asynchronous data 133 to the client 112. Thereafter, the portion of the network page server application 121 ends. In a variation on the flowchart of FIG. 4, the pre-fetched data may be obtained from the service application 154 after the asynchronous data request 130 has been received from the client 112. In such a case, the network page server application 121 may block until the request may be satisfied.

Figure 5:
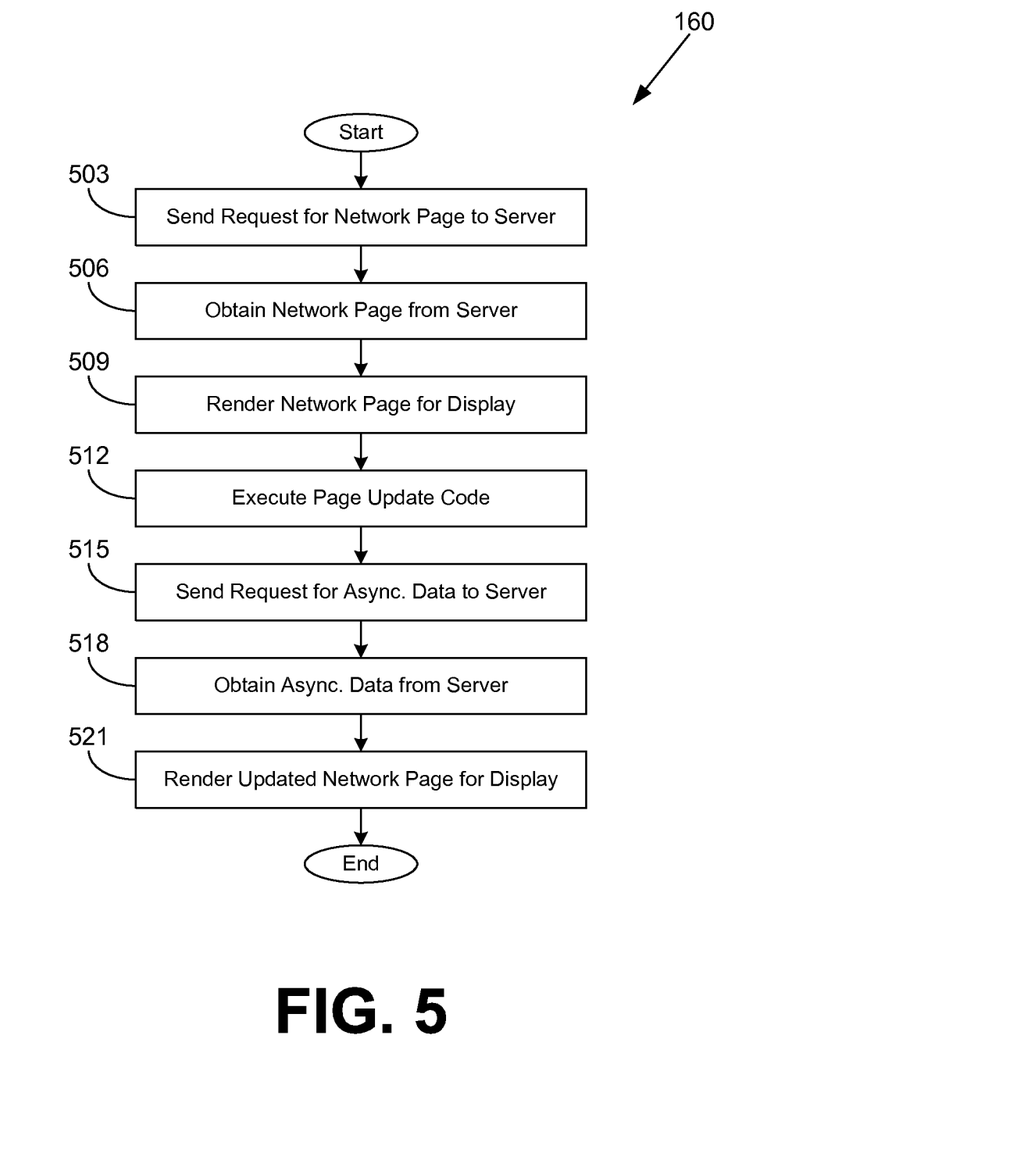
FIG. 5 is a flowchart illustrating one example of functionality implemented as portions of a browser executed in a client in the networked environment of FIG. 1 according to various embodiments of the present disclosure.

Continuing now to FIG. 5, shown is a flowchart that provides one example of the operation of a portion of the browser 160 according to various embodiments. It is understood that the flowchart of FIG. 5 provides merely an example of the many different types of functional arrangements that may be employed to implement the operation of the portion of the browser 160 as described herein. As an alternative, the flowchart of FIG. 5 may be viewed as depicting an example of steps of a method implemented in the client 112 (FIG. 1) according to one or more embodiments.

Beginning with box 503, the browser 160 sends a network page request 127 (FIG. 1) to the network page server application 121 (FIG. 1). In box 506, the browser 160 obtains a network page 124 (FIG. 1) from the network page server application 121. In box 509, the browser 160 renders the network page 124 for display as a rendered network page 163 (FIG. 1). In box 512, the browser 160 executes page update code 166 (FIG. 1) embedded or associated with the network page 124.

The page update code 166 causes the browser 160 to send an asynchronous callback (asynchronous data request 130 (FIG. 1)) to the network page server application 121 in box 515. The asynchronous data request 130 may specify a unique identifier as determined in the page update code 166. In box 518, the browser 160 obtains the asynchronous data 133 (FIG. 1) from the network page server application 121 in response to the asynchronous data request 130. In box 521, the page update code 166 causes the browser 160 to render an updated network page 124 for display. Thereafter, the portion of the browser 160 ends.

Figure 6:
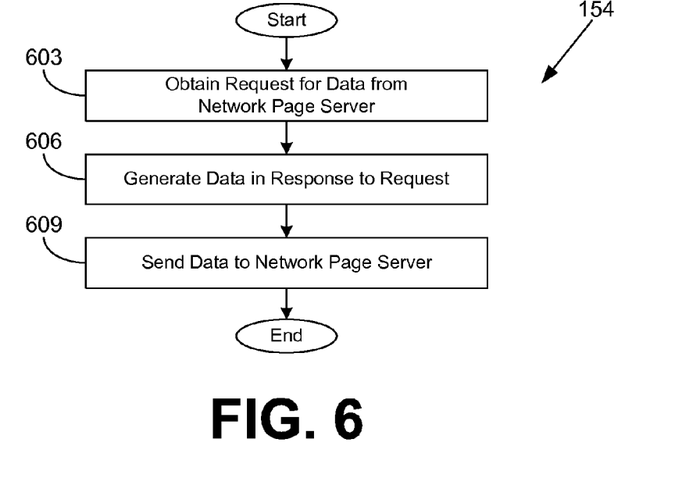
FIG. 6 is a flowchart illustrating one example of functionality implemented as portions of a service application executed in a computing device in the networked environment of FIG. 1 according to various embodiments of the present disclosure.

Referring next to FIG. 6, shown is a flowchart that provides one example of the operation of a portion of the service application 154 according to various embodiments. It is understood that the flowchart of FIG. 6 provides merely an example of the many different types of functional arrangements that may be employed to implement the operation of the portion of the service application 154 as described herein. As an alternative, the flowchart of FIG. 6 may be viewed as depicting an example of steps of a method implemented in the computing device 106 (FIG. 1) according to one or more embodiments.

Beginning with box 603, the service application 154 obtains a service request 136 (FIG. 1) for data from the network page server application 121 over the network 109 (FIG. 1). In box 606, the service application 154 generates data in response to the service request 136. The data may be generated based at least in part on data in the data store 151 (FIG. 1). In some cases, the data may be stored in a data cache accessible to the service application 154. In box 609, the service application 154 sends the data to the network page server application 121 in a service response 139 (FIG. 1) over the network 109. Thereafter, the portion of the service application 154 ends.

Figure 7:
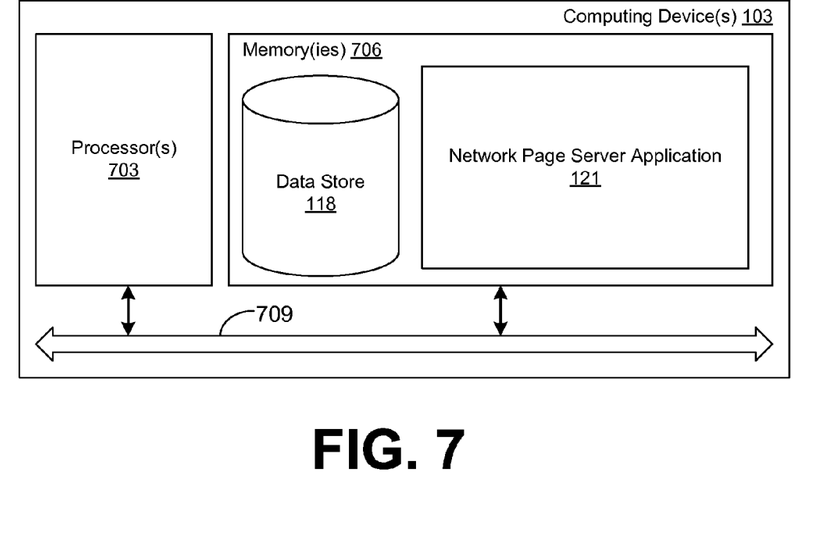
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network page server application 121 and potentially other applications. Also stored in the memory 706 may be a data store 118 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the network page server application 121, the browser 160 (FIG. 1), the service application 154 (FIG. 1), the page update code 166 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The sequence diagram of FIG. 3 and the flowcharts of FIGS. 4-6 show the functionality and operation of an implementation of portions of the browser 160, the network page server application 121, and the service application 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the sequence diagram of FIG. 3 and the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in the sequence diagram of FIG. 3 or the flowcharts of FIGS. 4-6 may be executed concurrently or with partial concurrence. Further, in some embodiments, one or more of the blocks shown in the sequence diagram of FIG. 3 or the flowcharts of FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server application 121, the browser 160, the service application 154, and the page update code 166, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains a request for a network page from a client;

code that sends the network page to the client, the network page including an asynchronous callback for data and code that is configured to update a rendering of the network page in the client based at least in part on the data, the asynchronous callback including a unique identifier;

code that determines whether the data may be pre-fetched;

code that pre-fetches the data from a service before obtaining the asynchronous callback for the data from the client when the data may be pre-fetched, wherein the code that pre-fetches is configured not to block the code that sends the network page to the client;

code that stores the data that has been pre-fetched in a cache in association with the unique identifier;

code that obtains the asynchronous callback for the data from the client, the asynchronous callback including the unique identifier;

code that determines whether the data is stored in the cache;

code that obtains the data from the cache based at least in part on the unique identifier when the data is stored in the cache;

code that obtains the data from the service when the data is not stored in the cache; and code that sends the data to the client in response to the asynchronous callback.

2. A system, comprising:
   at least one computing device; and
   a network page server application executable in the at least one computing device, the network page server application comprising:
   logic that determines whether a network page requested by a client is configured to prompt the client to initiate an asynchronous callback for data that may be pre-fetched;
   logic that pre-fetches the data from a service before obtaining the asynchronous callback for the data from the client; and
   logic that sends the data that has been pre-fetched from the service to the client in response to obtaining the asynchronous callback for the data from the client.

3. The system of claim 2, wherein the network page server application further comprises:
   logic that obtains a request for the network page from the client; and
   logic that sends the network page to the client in response to the request.

4. The system of claim 3, wherein the logic that pre-fetches the data begins executing prior to the logic that sends the network page, and the logic that pre-fetches the data is non-blocking.

5. The system of claim 3, wherein the logic that pre-fetches the data is executed in a thread that is separate from the logic that sends.

6. The system of claim 2, wherein the network page is configured to prompt another asynchronous callback for other data that may not be pre-fetched.

7. The system of claim 2, wherein the logic that sends the data that has been pre-fetched is further configured to transform the data before sending the data to the client.

8. The system of claim 2, wherein the network page server application further comprises:
   logic that obtains another asynchronous callback for the data from another client;
   logic that determines whether the data is cached and is valid; and
   logic that sends the data that has been pre-fetched from the service to the other client in response to the other asynchronous callback when the data is cached and is valid.

9. The system of claim 2, wherein the network page server application further comprises logic that stores the data that has been pre-fetched from the service in a cache.

10. The system of claim 2, wherein the network page server application further comprises logic that generates the network page, and the network page includes code that prompts the client to initiate the asynchronous callback for the data.

11. The system of claim 10, wherein the asynchronous callback is configured to include a unique identifier, and the logic that pre-fetches the data is further configured to associate the data with the unique identifier.

12. The system of claim 11, wherein the network page server application further comprises:
   logic that stores the data that has been pre-fetched from the service in a cache, the data being associated with the unique identifier;
   logic that obtains the asynchronous callback for the data from the client, the asynchronous callback including the unique identifier; and
   logic that obtains the data from the cache based at least in part on the unique identifier from the asynchronous callback for the data.

13. The system of claim 11, wherein the unique identifier corresponds to a unique identifier for a user associated with the client.

14. The system of claim 11, wherein the unique identifier corresponds to a unique identifier for the asynchronous callback for the data.

15. A method, comprising the steps of:
   obtaining, in at least one computing device, a request for a network page from a client;
   pre-fetching, in the at least one computing device, data from a service before obtaining an asynchronous callback for the data from the client;
   sending, in the at least one computing device, the network page to the client, the network page including the asynchronous callback for the data;
   obtaining, in the at least one computing device, the asynchronous callback for the data from the client; and
   sending, in the at least one computing device, the data that has been pre-fetched from the service to the client in response to the asynchronous callback from the client.

16. The method of claim 15, further comprising the step of storing, in the at least one computing device, the data that has been pre-fetched from the service in a cache in association with a timestamp.

17. The method of claim 15, wherein the pre-fetching step is performed in response to the step of obtaining the request for the network page from the client.

18. The method of claim 17, wherein the pre-fetching step is performed further in response to determining that the network page includes the asynchronous callback for the data and determining that the data may be pre-fetched.

19. The method of claim 15, wherein the asynchronous callback includes a unique identifier, the data that has been pre-fetched from the service is identified by the unique identifier.

20. The method of claim 15, wherein the network page includes another asynchronous callback for other data, and the method further comprises the steps of:
   obtaining, in the at least one computing device, the other asynchronous callback for the other data from the client;
   obtaining, in the at least one computing device, the other data from another service in response to the other asynchronous callback; and
   sending, in the at least one computing device, the other data to the client.

21. The method of claim 15, wherein the network page includes code that is configured to update a rendering of the network page in the client based at least in part on the data.

22. A method, comprising the steps of:
   sending, in the at least one computing device, a network page to a client in response to a request, the network page including code that is configured to generate asynchronous callbacks for data;
   obtaining, in the at least one computing device, a first data set from at least one service in response to obtaining a first asynchronous callback for the first data set;
   pre-fetching, in the at least one computing device, a second data set from the at least one service before obtaining a second asynchronous callback for the second data set from the client;
   obtaining, in the at least one computing device, the second asynchronous callback for the second data set from the client; and
   sending, in the at least one computing device, the first data set and the second data set to the client.

23. The method of claim 22, wherein the second data set is pre-fetched based at least in part on the first asynchronous callback.

24. The method of claim 22, wherein the second data set is pre-fetched based at least in part on the first data set.

25. The method of claim 22, wherein the second asynchronous callback is generated in the client based at least in part on the first data set.

* * * * *